United States Patent
Goulding et al.

(10) Patent No.: US 11,861,389 B2
(45) Date of Patent: Jan. 2, 2024

(54) COMPILING A SPECIFIED INSTRUCTION FROM A FIRST VIRTUAL APPLICATION TO A SECOND VIRTUAL APPLICATION

(71) Applicant: Red Hat, Inc., Raleigh, NC (US)

(72) Inventors: Ryan Goulding, Concord, MA (US); Andrew Toth, Westford, MA (US); Aneesh Puttur, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 471 days.

(21) Appl. No.: 17/196,053

(22) Filed: Mar. 9, 2021

(65) Prior Publication Data

US 2022/0291938 A1 Sep. 15, 2022

(51) Int. Cl.
*G06F 9/455* (2018.01)
*G06F 9/30* (2018.01)
*G06F 9/38* (2018.01)

(52) U.S. Cl.
CPC ...... *G06F 9/45558* (2013.01); *G06F 9/30145* (2013.01); *G06F 9/3836* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 5,768,593 A | 6/1998 | Walters et al. | |
| 7,614,044 B2 | 11/2009 | Bhansali et al. | |
| 9,201,765 B2 | 12/2015 | Muske | |
| 9,965,259 B2 | 5/2018 | Vargas | |
| 2001/0005852 A1* | 6/2001 | Bogle | G06F 11/3664 714/E11.21 |
| 2017/0161177 A1* | 6/2017 | Bird | G06F 11/3672 |
| 2020/0252271 A1 | 8/2020 | Elliott, IV | |

OTHER PUBLICATIONS

Github, Inc. "Porting Existing Helm Charts to Ansible Operator"; 2020; https://github.com/operator-framework/operator-sdk/issues/2759; retrieved Dec. 29, 2020.

"Creating an Ansible Role from a Helm Chart"; https://redhat-connect.gitbook.io/certified-operator-guide/ansible-operators/building-an-ansible-operator/creating an-ansible operator-from-a-helm-chart; retrieved Dec. 29, 2020.

* cited by examiner

*Primary Examiner* — Adam Lee
(74) *Attorney, Agent, or Firm* — K&L Gates LLP

(57) ABSTRACT

Systems and methods are described for compiling a specified instruction from a first virtual application to a second virtual application. Each virtual application may be associated with different programming languages. In an example method, a computing device receives a request to execute the specified instruction in the second virtual application. A target data structure may be created, using a library of the second virtual application, where a template directory may be stored. First syntax features, each defining a respective variable may be identified. An abstract syntax tree may be used to derive, for each first syntax feature, a modified definition for the respective variable. Second syntax features may be generated that define the respective variables more precisely than the first syntax features. The specified instruction may be rendered the second virtual application and may be expressed via the second syntax features and their respective variables.

19 Claims, 5 Drawing Sheets

COMPILING A SPECIFIED INSTRUCTION FROM A FIRST VIRTUAL APPLICATION TO A SECOND VIRTUAL APPLICATION

BACKGROUND

Application lifecycle management (ALM) often involves the governance, development, and maintenance of computer programs. Various virtual applications (e.g., ALM) tools may be used to perform different functions and/or phases of the application lifecycle management. These virtual applications may use different programming languages and/or structures. For example, KUBERNETES is a container-orchestration system for automating computer application deployment, scaling, and management. KUBERNETES often relies on one or more virtual applications, such as HELM and ANSIBLE. For example, operators used by HELM (e.g., HELM charts) are typically written using the GOLANG template language, and help to define, install, and upgrade software on the KUBERNETES application lifecycle management platform. Similarly, operators used in ANSIBLE are typically written using the JINJA2 and YAML languages, which may provide software provisioning, configuration management, and software deployment capabilities on the KUBERNETES platform.

SUMMARY

The present disclosure provides new and innovative systems and methods for compiling a specified instruction from a first virtual application to a second virtual application. In an example, a method performed by a computing device having one or more processors may include receiving, from a first virtual application, a request to execute a specified instruction in a second virtual application. The first virtual application may be associated with a first programming language and the second virtual application may be associated with a second programming language. The computing device may create, using a library of a second virtual application, a target data structure within the second virtual application. One or more templates identified from the specified instruction may be stored to a template directory in the target data structure. From the specified instruction, the computing device may identify a plurality of first syntax features. Each first syntax feature may define a respective variable. Furthermore, the computing device may generate, e.g., using the specified instruction, an abstract syntax tree to derive, for each first syntax feature, a modified definition for the respective variable. Based on the modified definitions, the computing device may generate second syntax features (e.g., using the library of the second virtual application). The second syntax features may define the respective variables more precisely than the first syntax features. Thus, the computing device may render the specified instruction into the one or more templates (e.g., using the second virtual application). The specified instruction may be expressed via the second syntax features and their respective variables.

In an example, a system includes a first server hosting a first virtual application associated with a first language; a second server hosting a second virtual application associated with a second language; memory; and one or more processors in communication with the memory. The memory may store instructions that, when executed by the one or more processors, may cause the processor to receive, from the first server, a request to compile a specified instruction for the second virtual application. The request may include an identifier of the second server. The processor of the system may use the identifier to cause the second server to create a target data structure within the second virtual application. One or more templates identified from the specified instruction may be stored to a template directory in the target data structure. Furthermore, the instructions, when executed, may cause the processor to identify, from the specified instruction, a plurality of first syntax features. Each first syntax feature may define a respective variable. The instructions, when executed, may cause the processor to determine, using the specified instruction and for each first syntax feature, a modified definition for the respective variable. Based on the modified definitions, second syntax features may be generated (e.g., using the library of the second virtual application). The second syntax features may define the respective variables more precisely. The instructions, when executed, may cause the processor to render the specified instruction into the one or more templates (e.g., using the second virtual application). The specified instruction may thus be expressed via the second syntax features and their respective variables.

In an example, a non-transitory computer-readable medium for use on a computer system containing computer-executable programming instructions for cross-compiling specified instruction between two virtual applications. The method may include receiving, from a first virtual application, a request to compile a source code for the specified instruction for a second virtual application. A target data structure may be created within the second virtual application (e.g., using a library associated with the second virtual application). One or more templates identified from the specified instructions may be stored to a template directory in the target data structure. Furthermore, a plurality of first syntax features may be identified from the source code. Each first syntax feature may define a respective variable. For each first syntax feature, a modified definition for the respective variable may be determined, e.g., using the specified instruction. Based on the modified definitions, and using the library of the second virtual application, second syntax features may be generated that may define the respective variables more precisely. Furthermore, using the second virtual application, the specified instruction may be rendered into the one or more templates. The specified instruction may comprise the second syntax features and their respective variables.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
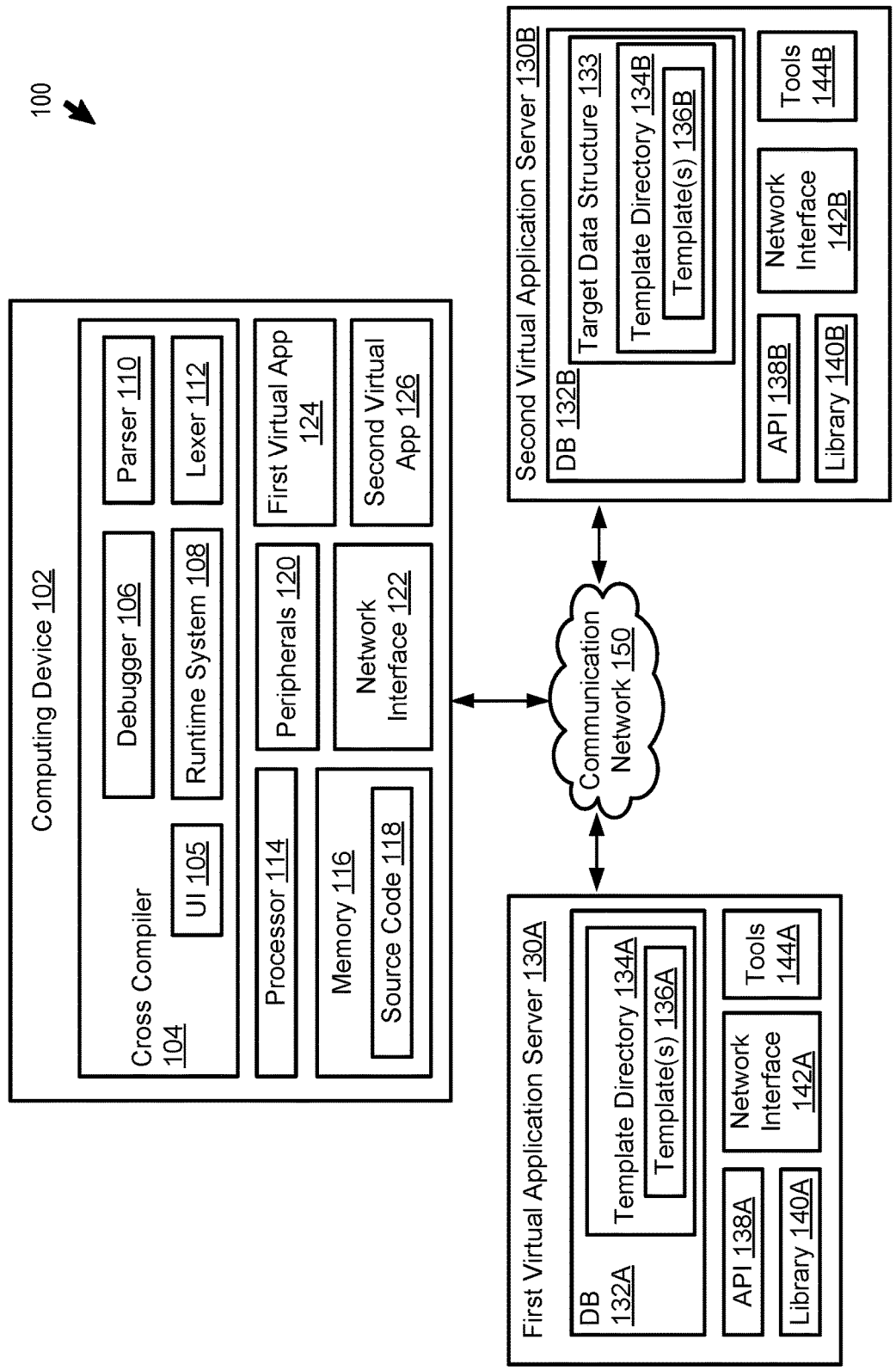
FIG. 1 illustrates a block diagram of an example computer network environment for compiling a specified instruction from a first virtual application to a second virtual application according to an example embodiment of the present disclosure.

During the course of an application lifecycle management, it is often difficult to switch from one virtual application to another virtual application to perform different functions and/or phases of the application lifecycle management. Often, these virtual applications support different languages and/or structures. Thus, conversion and/or transfer of software, programs, code and/or other specified instructions from one virtual application to another virtual application can be difficult and tedious. Various embodiments of the present disclosure describe novel and nonobvious systems and methods for compiling a specified instruction from a first virtual application to a second virtual application.

For example, KUBERNETES is a container-orchestration system for automating computer application deployment, scaling, and management. KUBERNETES often relies on one or more virtual applications, such as HELM and ANSIBLE. While HELM is often used to provide the early phases of application lifecycle development, HELM operators may not be as effective or desirable in performing later phases of the application lifecycle development. Often, users desire operators with robust functionality in order to take care of the later phases. A virtual application like ANSIBLE may have such robust operators. There is a desire and need for a tool to automate the conversion from operators used by HELM to operators used by ANSIBLE, as the ANSIBLE operators are more suitable for the later phases of application lifecycle development. However, while HELM operators are written using the GOLANG template language, ANSIBLE operators are written using JINJA2 and YAML. Helm ANSIBLE template exporter is a set of utilities that may be used to automate conversion of HELM operators (e.g., HELM Charts) into ANSIBLE operators. However, the conversion of HELM operators (e.g., HELM Charts) into ANSIBLE operators is not straightforward. The presently disclosed systems and methods provide novel and nonobvious systems and methods for converting HELM operators into ANSIBLE operators. Furthermore, the disclosed process of compiling the specified instruction from the first virtual application (e.g., HELM) to the second virtual application (e.g., ANSIBLE) may involve the generation of new syntax features (e.g., "second syntax features") that are based on a determination of more precise definitions of variables and properties previously defined by current syntax features used by the first virtual application (e.g., "first syntax features").

Thus, generating the second syntax features may result in a smaller allocation of dynamic memory when executing the specified instruction in the second virtual application, as the processor may more quickly determine the precise definition of a variable or property defined by a syntax feature. The execution of a specified instruction using the new syntax features may result in shorter runtime, increased accuracy of the intended result of the specified instruction, and a more robust software development. For example, certain variables, and/or their definitions, may be deemed to not be as useful or relevant, e.g., in the application lifecycle management operations performed by the second virtual application. Such variables and/or their definitions or properties may be eliminated. In some aspects, the elimination may involve analyzing the specified instructions, generating an Abstract Syntax Tree (AST), and then performing a branch pruning.

In some aspects, the execution of the specified instruction using the new syntax features generated using the systems and methods described herein may increase processor efficiency, e.g., by requiring less CPU cycles. For example, a first syntax feature (e.g., a "for" loop, such as "for x in range(5) print (x)") may take a very long time to execute in the second virtual application. The first syntax feature may be replaced with a substitute syntax feature (e.g., a plurality of "print" functions," such as "print(1)print(2)print(3)print (4)print(5)"), which may achieve the same result but may take less time.

FIG. 1 illustrates a block diagram of an example computer network environment for compiling a specified instruction from a first virtual application to a second virtual application according to an example embodiment of the present disclosure. The network environment 100 may include a computing device 102, a first virtual application server 130A, and a second virtual application server 130B. One or more of these components may be able to communicate with one another over a communication network 150. As will be described, these components may be used to compile, cross-compile, convert, and/or execute a specified instruction from a first virtual application to a second virtual application according to an example embodiment of the present disclosure. For example, at a high level, a user may have developed software to a certain stage using an application development platform ("first application development platform") provided by a first virtual application server. The user may wish to use a second application development platform provided by the first virtual application server for a number of reasons, as will be explained in relation to FIG. 4. While the user may thus want to transfer the software developed using the first application development platform to the second application development platform, the software may have been developed in a programming language and structure used by the first application development platform but not the second application development platform. The computing device may involve subsystems that coordinate with subsystems of the first virtual application server 130A and second virtual application server 130B to transfer the developed software to the second application development platform, e.g., so that the user can continue software development operations on the second application development platform.

The computing device 102 may comprise a portable computing device (e.g., a mobile device, personal digital assistant, laptop, tablet computers, smart camera, etc.) having one or more of the subcomponents described herein for compiling a specified instruction from a first virtual application to a second virtual application. The computing device 102 may include, for example, a cross compiler 104, a processor 114, memory 116, peripherals 120, a network interface 122, a first virtual application 124, and a second virtual application 126.

The cross compiler 104 may comprise subcomponents involved with receiving a specified instruction in a first language and syntax being used in the first virtual application 124, and converting the specified instruction into a second language and syntax for use in the second virtual application 126. The specified instruction, in either or both language, may be stored as source code 118 in memory 116. In some aspects, the cross compiler 104 may comprise a user interface (UI) 105, a debugger 106, a runtime system 108, a parser 110, and a lexer 112. The UI may allow the user of the computing device 102 to input commands and view results or status of a compilation. The debugger 106 may comprise a software component used to test and debug a target program, such as the specified instruction upon a partial and/or complete conversion to a language or syntax supported by the second virtual application 126. The runtime system 108 may comprise a software component used to provide the user with the result of an execution of a specified instruction (e.g., after it has been converted, compiled, and/or cross-compiled into the second virtual application 126). The parser 110 may comprise a software component that takes input data (e.g., the specified instruction from the first virtual application) and builds a data structure (e.g., a parse tree, an abstract syntax tree, a hierarchical structure, etc.). The parser 110 may be used to provide a structural representation of the input while checking for syntax. The lexer 112 may comprise a software component that can convert a sequence of characters (e.g., source code for the specified instructions) into a sequence of tokens. The converted tokens may have meaning that may be identifiable by the computing device 102, the first virtual application 124 and/or first virtual application server 130A, or the second virtual application 126 and/or second virtual application server 130B.

The processor 114 may comprise any one or more types of digital circuit configured to perform operations on a data stream, including functions described in the present disclosure.

The memory 116 may comprise any type of long term, short term, volatile, nonvolatile, or other memory and is not to be limited to any particular type of memory or number of memories, or type of media upon which memory is stored. The memory may store instructions that, when executed by the processor 114, can cause the computing device 102 to perform one or more methods discussed herein.

The peripherals 120 may comprise auxiliary devices (e.g., keyboard, mouse, monitor, display, graphic user interface, touch-sensitive display, etc.) used to enter input signals and/or view outputted information (e.g., specified instructions at a stage of compilation).

The first virtual application 124 and the second virtual application 126 may be examples of software development tools, which may be installed in computing device, or may otherwise be accessible by the computing device 102 (e.g., via a browser enablement). The first virtual application 124 and the second virtual application 126 may be hosted, managed, and/or otherwise implemented via first virtual application server 130A and second virtual application server 130B, respectively. Furthermore, the user may desire that a specified instruction (e.g., a software or application that is the subjected to application lifestyle management or software development operation) be migrated from the first virtual application 124 to the second virtual application 126. However, the first virtual application 124 to the second virtual application 126 may support different languages and structures for the specified instruction. For example, while HELM may be an example of the first virtual application 124, ANSIBLE may be an example of the second virtual application 126. While operators used by HELM (e.g., HELM charts) are typically written using the GOLANG template language, operators used in ANSIBLE are typically written using the JINJA2 and YAML languages. Systems and methods are disclosed herein for compiling the specified instruction from the first virtual application 124 to the second virtual application 126.

The first virtual application server 130A and the second virtual application server 130B may comprise a local or a remote computing system for providing an interface for the first virtual application 124 and the second virtual application 126, respectively, processing and storing information received from the respective virtual applications, enabling access to databases, libraries, and other tools provided by the respective virtual applications, and facilitating the compilation of the specified instruction from the first virtual application 124 to the second virtual application 126.

For example, the first virtual application server 130A may include one or more subcomponents that help to facilitate the use of the first virtual application 124 in performing functions of application lifecycle management, and to facilitate providing sufficient information to the computing device 104 (specifically, for example, cross compiler 104) to convert and/or compile a specified instruction from the first virtual application 124 to the second virtual application 126. For example, the first virtual application server 130A may include one or more databases 132A, which may store, for example, a template directory 134A storing one or more templates 136A. The templates 136A may comprise for example, files of various code in the language or structure supported by the first virtual application 124. For example, the templates 136A may include GOLANG files to support one or more HELM based operators. The user may, via the first virtual application 124, create, read, update, or delete templates.

The first virtual application server 130A may further comprise an API 138A, a library 140A, a network interface 142A, and one or more tools 144A The API 138A can manage interactions with the first virtual application 124 installed and/or accessed by computing device 102 and other computing devices, including providing access to other subcomponents of first virtual application server 130A (e.g., databases 132A, library 140A, tools, 144A). The library 140A may store non-volatile resources for use in the first virtual application 124 for performing one or more functions in the application lifecycle and/or software development. For example, the library 140A may include configuration data, documentation, help data, message templates, pre-written code and subroutines, classes, values and/or type specifications. The tools 144A may include programs, plug-ins, and/or other operators (e.g., HELM Charts) for use in software development operations performed by the first virtual application 124.

The second virtual application server 130B may include one or more subcomponents that are similar to, or cognate with, the subcomponents of the first virtual application server 130A. For example, the second virtual application 130B may include one or more databases 132B. As will be described herein, a target data structure 133 may be created within the databases 132B. The target data structure 133 may include a template directory 134B for storing one or more templates(s) 136B. The target data structure 133 may store the specified instructions when or as they are converted and/or compiled to the language and format supported by the second virtual application 126. The second virtual application server 130B may further include an application program interface (API) 138B for hosting or managing the second virtual application 126, a library 140B, a network interface 142B, and one or more tools 144B.

The communication network 150 comprises wired and wireless networks. Examples of the wired networks may include a wide area network (WAN) or a local area network (LAN), a client-server network, a peer-to-peer network, and so forth. Examples of the wireless networks comprise Wi-Fi, a global system for mobile communications (GSM) network, and a general packet radio service (GPRS) network, an enhanced data GSM environment (EDGE) network, 802.5 communication networks, code division multiple access (CDMA) networks, Bluetooth networks or long term evolution (LTE) network, LTE-advanced (LTE-A) network or 5th generation (5G) network.

One or more devices of the computer network environment may each comprise a network interface (e.g., network interface 122, network interface 142A, network and network interface 142B) to allow the respective device to communicate with the communication network 150. For example, the respective network interface may comprise a wired interface (e.g., electrical, RF (via coax), optical (via fiber)), a wireless interface, a, modem, etc.

Figure 2:
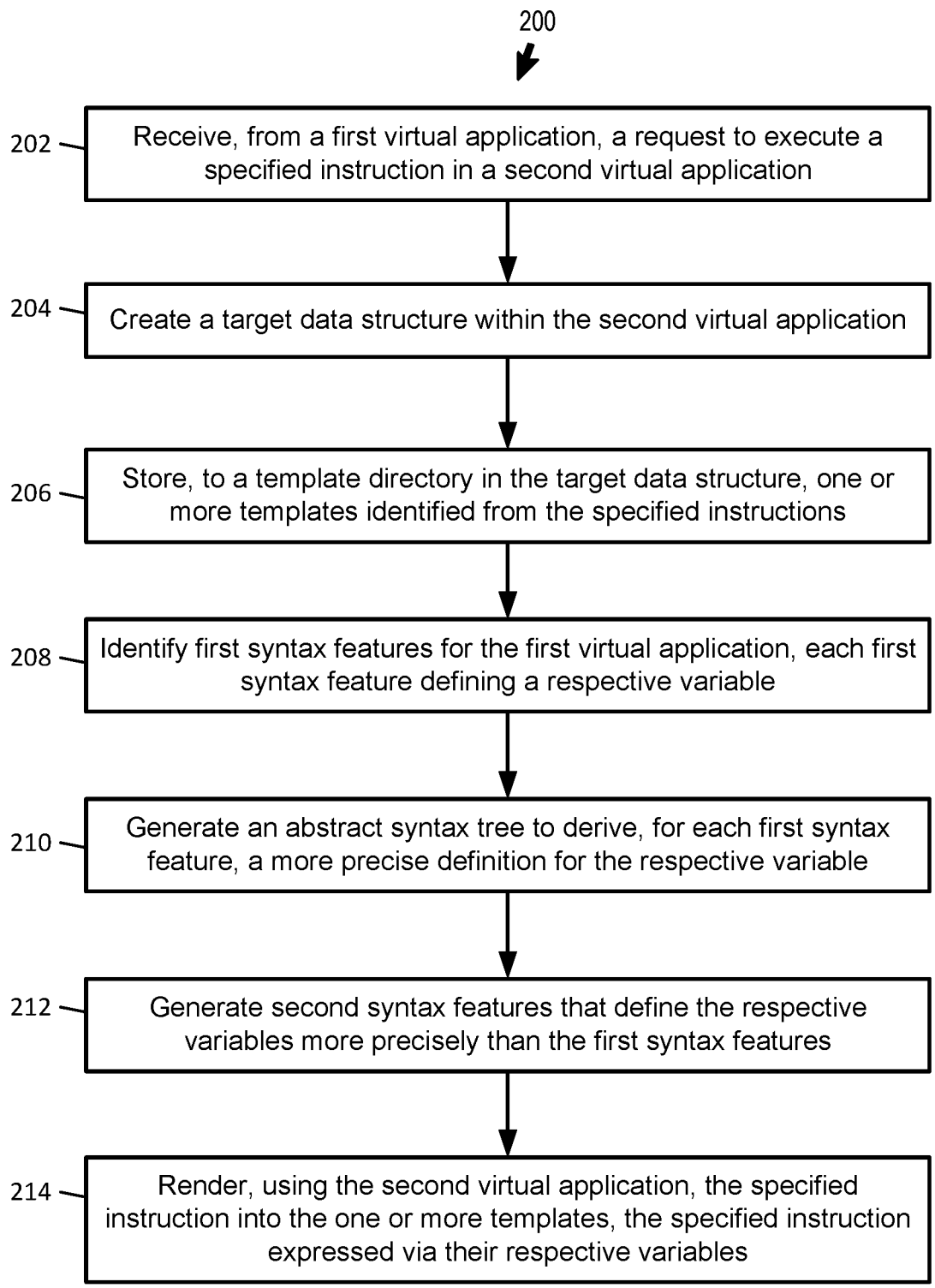
FIG. 2 illustrates a flowchart of an example process for compiling a specified instruction from a first virtual application to a second virtual application according to an example embodiment of the present disclosure.

FIG. 2 illustrates a flowchart of an example process 200 for compiling a specified instruction from a first virtual application to a second virtual application according to an example embodiment of the present disclosure. The process 200 may be performed by one or more processors of a computing device used to receive a specified instruction, access libraries, create and update data structures, and compile (e.g., as in processor 114 of computing device 102). Although the example process 200 is described with reference to the flow diagram illustrated in FIG. 2, it will be appreciated that many other methods of performing the acts associated with the process 200 may be used. For example, the order of some of the blocks may be changed, certain blocks may be combined with other blocks, blocks may be repeated, and some of the blocks described may be optional.

Process 200 may begin with the computing device receiving a request to execute a specified instruction in a second virtual application. (block 202). In some aspects, the request may be received via user input (e.g., via UI 105 of the computing device 104), and the specified instruction may be retrieved from the first virtual application. For example, a user that is performing application lifecycle testing or a software development operation on a specific application or program ("specified instruction") using a certain virtual application (e.g., first virtual application 124) may wish to use a different virtual application (e.g., second virtual application 126), e.g., for the next phase of the application lifecycle or software development. The user may indicate such a request in the cross compiler 104 of the computing device 102 via UI 105. The cross compiler 104 of the computing device 102 may thus receive, from the first virtual application 124, the specified instructions for which the user would like to continue the application lifecycle or software development in the second virtual application 126. Also or alternatively, the specified instruction may be stored as source code 118 in memory 116, and may be retrieved from the memory 116 by the cross compiler 104.

The computing device may create a target data structure within the second virtual application (block 204). For example, cross compiler 104 of the computing device 102 may automatically enter instructions for the creation of target data structure 133. When the instructions are executed, e.g., by runtime system 108, target data structure 133 may be created. In some aspects, the target data structure may be created using a library of the second virtual application (e.g., library 140B from the second virtual application server 130B). For example, a user may want to convert specified instructions from a first virtual application, such as HELM, to a second virtual application, such as ANSIBLE. In such an example, the cross compiler 104 may utilize a library such as ANSIBLE-GALAXY to initialize a new role for ANSIBLE, the second virtual application. The new role for ANSIBLE, e.g., via a target data structure, may be as a target destination for translated files of the specified instruction.

The computing device may store, to a template directory in the target data structure, one or more templates identified from the specified instructions (block 206). For example, cross compiler 104 of the computing device 102 may scan the specified instructions from the first virtual application 124 for possible template candidates. For example, parser 110 may scan the source code of the specified instruction to recognize, e.g., through lexer 112, tokens that identify templates. The cross compiler 104 may automatically enter instructions to store the identified templates into the target data structure 133. When the instructions are executed, e.g., by runtime system 108, the second virtual application 126 and/or its server 130B may include (e.g., within database 132B), the identified templates 136B. In some aspects (e.g., where the first virtual application 124 is HELM and the second virtual application 126 is ANSIBLE), the cross compiler 104 may copy templates from the template directory of HELM (e.g., HELM Chart directory) into the target structure of ANSIBLE (e.g., via ANSIBLE Role's templates directory).

The computing device may identify a plurality of syntax features used by the first virtual application to write the specified instructions (e.g., "first syntax features"). Each first syntax feature may define a respective variable. Syntax features, including the first syntax features, may include, but are not limited to, conditional statements, branch instructions, function statements, and the like. The cross compiler 104 of the computing device 102 may scan the specified instructions from the first virtual application 124 to identify the plurality of syntax features. For example, lexer 112 may scan the linear sequence of characters of the specified instruction into a linear sequence of tokens. The parser 110 may turn the linear sequence of tokens into a hierarchical syntax tree (e.g., abstract syntax tree (AST). The cross compiler 104 may resolve names and check types from the specified instruction, e.g., using the hierarchical syntax tree, to identify the plurality of syntax features.

Figure 3:
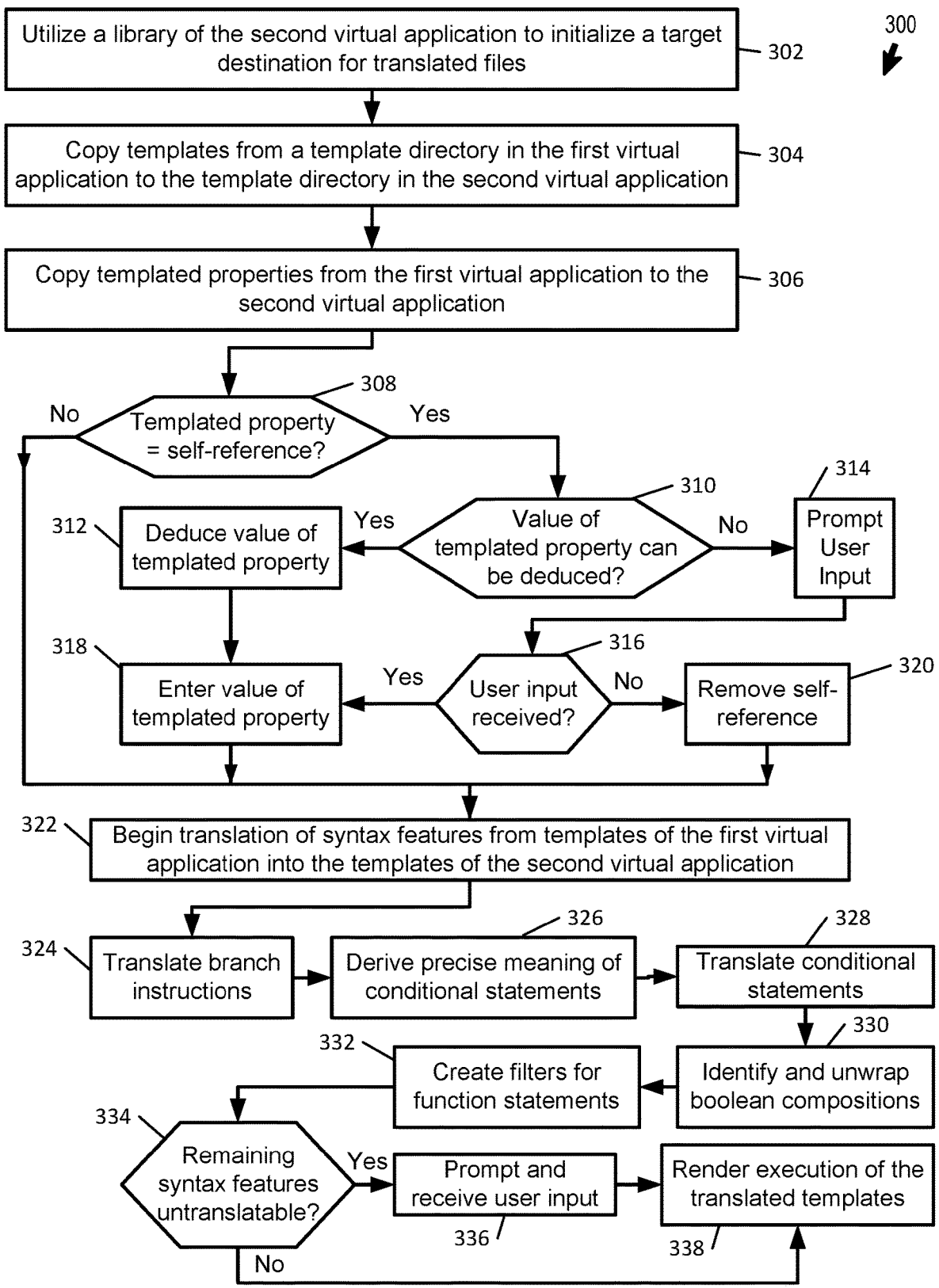
FIG. 3 illustrates a flow diagram of another example process for compiling a specified instruction from a first virtual application to a second virtual application according to an example embodiment of the present disclosure.

The computing device may derive, for each first syntax feature, a more precise definition for the respective variable (block 210). In some aspects, the more precise definition for the respective variable may be derived by generating an abstract syntax tree. For example, the parser 110 of the cross compiler 104 may use the sequence of tokens identified from the specified instructions to generate an abstract syntax tree. The abstract syntax tree (or any other hierarchical framework) may be used to identify the respective variable being defined by a syntax feature (e.g., conditional statement, branch instruction, function statement, etc.). In some aspects, the cross-compiler 104 or an associated tool (e.g., parser 110, lexer 112, etc.), after identifying a syntax feature, may scan the remainder of the specified instruction to determine how a respective variable is being defined. For example, the first syntax feature may define the respective variable ambiguously, such that, without understanding the context presented by the remainder of the specified instruction, could lead to more than one definition of the respective variable. Based on the determination of how the respective variable is defined, the cross-compiler 104 may use a library (e.g., library 140B) of the second virtual application 126, to determine if the respective variable can be defined more precisely. FIG. 3 presents an example of deriving the more precise definitions in more detail.

The computing device may generate second syntax features that define the respective variables more precisely than the first syntax features (block 212). As previously discussed, after the cross compiler 104 identifies a first syntax feature defining a respective variable, the cross compiler 104 may scan the specified instruction to understand the context behind syntax feature defining the respective variable, e.g., to ascertain a more precise definition of the respective variable. The first syntax feature, being coded in a programming language or structure of the first virtual application 124, may not be as precise in defining the respective variable as a syntax feature of the programming language or structure used by the second virtual application ("second syntax feature) in defining the respective variable. The cross compiler 104 may thus access a library (e.g., library 140B) of the second virtual application 126, to determine if the respective variable can be defined more precisely using a second syntax feature (e.g., a second a second conditional statement, a second branch instruction, a second function statement, etc.). If so, the cross compiler 104 may, for each identified first syntax feature, generate a second syntax feature that defines the respective variable more precisely than the first syntax feature. Thus, the cross compiler 104 of the computing device may rewrite the specified instruction in the language or structure supported by the second virtual application, e.g., by translating the first syntax features into second syntax features that define respective variables more precisely. FIG. 3 presents an example of generating the second syntax features in more detail.

As an example, if the first virtual application is HELM and if the second virtual application is ANSIBLE, deriving more precise definitions of the respective variable may involve determining more precise definitions of the respective variables involved in branch instructions. The branch instructions may include, but are not limited to conditional statements, loops, "with" clauses, "end" clauses, "range" functions, and "if" statements. For example, deriving a more precise definition of an "end" clause used in the specified instruction that is received in GOLANG, the language used by HELM, may involve deriving the meaning of the "end" clause. In GOLANG templates, the "end" clause may often be overloaded, and may be used for the "if" "range" and "with" subtrees. Since these subtrees can, and often are, heavily nested, an abstract syntax tree may be used to determine if the "end" keyword can be translated to an "endif" or an "endfor" clause used in JINJA2, a language supported by ANSIBLE, the second virtual application. Thus, the computing device may generate the second syntax feature "endif" or the second syntax feature "endfor," depending on the more precise defintiions of variables involved, which may be determined via the abstract syntax tree.

In another example involving HELM and ANSIBLE as the first and second virtual applications, the computing device may derive a more precise definition for a "range" function used in GOLANG, the language supported by HELM. The "range" function may be converted to a second syntax feature, such as "for-in" or a "for-each" function in the JINJA2 language used in ANSIBLE. In order to determine whether to convert the "range" function to a "for-in" or a "for-each" function, the cross compiler 104 of the computing device 102 may analyze the specified instruction to determine whether the "range" function performs iteration over a GOLANG map or a GOLANG slice. A type resolution may be used to determine whether to use a "for-in" versus a "for-each" function.

In another example involving HELM and ANSIBLE as the respective first and second virtual applications, the computing device may derive a more precise definition for an "if" statement used in GOLANG, the language used in HELM. GOLANG may often overload the "if" keyword such that "if x" can mean either "if x is true" or "if x is defined." Thus, "if" keywords used in the specified instruction in the GOLANG language may be ambiguous. Since HELM charts may often store definitions of variables and other properties in templates (e.g., in a template such as "values.yaml" stored in database 132A), the computing device may resolve this ambiguity by locating stored definitions of properties and variables in such templates (e.g., using a translation heuristic). If the HELM charts does not define the respective variable (e.g., "x") in a template, such as "values.yaml," then an "if" statement such as "if x" can be interpreted as "if x is defined." If x is defined in the templates, such as in the "values.yaml" template, then the type can be deduced by obtaining the value of x from the template. If x is true or false, then the GOLANG conditional may render, using the conditional logic, "if x."

The computing device may render the specified instruction into the one or more templates, e.g., using the second virtual application (block 214). For example, the cross compiler 104 may store the specified instruction, with first syntax features converted to the second syntax features, to one or more templates 136B and/or target data structure 133. The specified instruction may be expressed via the second syntax features defining the respective variables more precisely than the first syntax features. In some aspects (e.g., where the first virtual application 124 is HELM and the second virtual application 126 is ANSIBLE), the computing device, the computing device 102 may render the specified instruction into the one or more templates by installing an ANSIBLE task capable of rendering the translated templates.

FIG. 3 illustrates a flow diagram of another example process 300 for compiling a specified instruction from a first virtual application to a second virtual application according to an example embodiment of the present disclosure. The process 300 may be performed by one or more processors of a computing device used to receive a specified instruction, access libraries, create and update data structures, and compile (e.g., as in processor 114 of computing device 102). Although the example process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. For simplicity, examples of implementing one or more blocks of process 300 may be explained in relation to having HELM as the first virtual application and ANSIBLE as the second virtual application.

Method 300 may begin by utilizing a library of the second virtual application to initialize a target destination for translated files (block 302). For example, the cross compiler 104 of computing device 102 may utilize a library of ANSIBLE, such as ANSIBLE-GALAXY, to initialize a new role for ANSIBLE as a target destination for translated files of the specified instruction.

The computing device may then copy templates from a template directory in the first virtual application to the template directory in the second virtual application (block 304). For example, cross compiler 104 may raw copy GOLANG templates from a directory associated with HELM Chart (e.g., template directory 134A) into the template directory associated with the with ANSIBLE (e.g., template directory 134B).

The computing device may copy templated properties from the first virtual application to the second virtual application (block 306). As used herein, a template property may involve variables that are defined in the specified instruction in one or more templates, e.g., in the programming language used by a virtual application. For example, the computing device may copy the contents of a HELM Chart's "values.yaml" template to ANSIBLE's "defaults/main.yaml" template. The HELM Chart's "values.yaml" template may define the template properties for a HELM Chart, while "defaults/main.yaml" may be used to define properties for an ANSIBLE role.

For each of the copied templated properties, the computing device may determine whether a templated property is a self-reference (block 308). As used herein, a "self-reference" may refer to a feature used in HELM Chart, which allows users to define a property in the template "values.yaml" and then reference the property in a subsequent configuration. ANSIBLE may not include an equivalent feature, and thus the computing device 102 may perform one or more steps described herein to resolve issues of "self-reference" in the specified instruction when converting the specified instruction to a form acceptable by the second virtual application 126.

If a given templated property is a self-reference, the computing device may determine if the value of the templated property can be deduced (block 310). For example, the value of the template property can be deduced by determining the relation of the template property to other properties or variables in the specified instruction that may be defined more precisely. If the value can be deduced, the computing device may deduce the value of the template property (block 312), and may enter the value of the template property (block 318). If the value of the template property cannot be deduced, the computing device may prompt user input (block 314), and check if user input has been received (block 316). If the user has inputted value of the template property, the computing device may enter the value of the templated value (block 318). If the user input has not been received, the computing device may remove the self-reference (block 320).

After each self-referenced template property is processed through blocks 310 through 320, or if the computing device determines that the template properties do not include any self-references, the computing device may begin translation of syntax features from templates of the first virtual application into the templates of the second virtual application (block 322).

For example, the computing device may translate one or more branch instructions in the specified instructions (block 324), e.g., to a second syntax feature. The branch instructions may include, but are not limited to conditional statements, loops, "with" clauses, "end" clauses, "range" functions, and "if" statements. In some aspects, the cross compiler 104 of the computing device 102 may convert the syntax of branch bodies to utilize the notations "{% ... %}" instead of "{{ ... }}" in the respective source code of the specified instruction. Translating an "end" clause to a second syntax feature may involve deriving a more precise meaning of the "end" clause from the specified instruction. In GOLANG templates, the "end" clause may often be overloaded, and may be used for the "if" "range" and "with" subtrees. Since these subtrees can, and often are, heavily nested, an abstract syntax tree may be used to determine if the "end" keyword can be translated to an "endif" or an "endfor" clause used in JINJA2, a language supported by ANSIBLE, the second virtual application. Thus, the computing device may generate the second syntax feature "endif" or the second syntax feature "endfor," depending on the more precise definitions of variables involved, which may be determined via the abstract syntax tree.

The computing device may derive more precise meanings of one or more conditional statements in the specified instruction (block 326), and then translate the conditional statements (block 328). For example, the computing device may derive a more precise definition for a "range" function used in GOLANG, the language used in HELM. The "range" function may be converted to a second syntax feature, such as "for-in" or a "for-each" function in the JINJA2 language used in ANSIBLE. In order to determine whether to convert the "range" function to a "for-in" or a "for-each" function, the cross compiler 104 of the computing device 102 may analyze the specified instruction to determine whether the "range" function performs iteration over a GOLANG map or a GOLANG slice. A type resolution may be used to determine whether to use a "for-in" versus a "for-each" function.

Furthermore, the computing device may derive a more precise definition for an "if" statement used in GOLANG, the language used in HELM. GOLANG may often overload the "if" keyword such that "if x" can mean either "if x is true" or "if x is defined." Thus, "if" keywords used in the specified instruction in the GOLANG language may be ambiguous. Since HELM charts may often store definitions of variables and other properties in templates (e.g., in a template such as "values.yaml" stored in database 132A), the computing device may resolve this ambiguity by locating stored definitions of properties and variables in such templates (e.g., using a translation heuristic). If the HELM charts does not define the respective variable (e.g., "x") in a template, such as "values.yaml," then an "if" statement such as "if x" can be interpreted as "if x is defined." If x is defined in the templates, such as in the "values.yaml" template, then the type can be deduced by obtaining the value of x from the template. If x is true or false, then the GOLANG conditional may render, using the conditional logic, "if x."

The computing device may identify and unwrap Boolean compositions identified from the specified instructions (block 330). HELM templates written in GOLANG may often use prefix syntax for "and" and "or". For example, a sample GOLANG code in a HELM Template using Boolean compositions may recite "{{if and condition1 condition2}}". However, JINJA2, the language used by ANSIBLE, may use Boolean compositions in an ordered syntax. Thus, the above recited statement may be rewritten in JINJA2 as "{% if condition1 and condition 2%}. Additionally, Boolean compositions in ANSIBLE may be heavily nested. The computing device may thus identify and unwrap Boolean compositions by generating Abstract Tree Nodes from the specified instructions received from the first virtual application and reorganizing the Abstract Tree Nodes to adhere to JINJA2 syntax.

The computing device may create filters for function statements (block 332). For example, the cross compiler 104 of computing device 102 may create ANSIBLE Filter replacements for HELM's function statements written in GOLANG. In some aspects, filters may be created for function statements that have string outputs by using an implementation of a generic ANSIBLE Filter that can invoke the cross compiler 104 at runtime, using the name of the GOLANG template having the function statement and any arguments. For example, cross compiler 104 may use the function "[["nginix.imagePullSecrets".|filter("indent",6) }}" for the invocation. The rendered result may be returned and may be identical to a "text/template" function call. Also or alternatively, non-string objects may be returned via the function statement, e.g., using a "toMap" function.

The computing device may determine whether any of the remaining syntax features from the specified instruction are untranslatable (block 334). If the syntax features have been successfully translated, and/or if there are no remaining syntax features that are untranslatable, the computing device may render the execution of the translated templates (block 338).

If there are remaining syntax features that are untranslatable, the computing device 102 may prompt and receive user input (block 336), e.g., to translate the syntax features so that the specified instruction is in a language and/or structure that can be supported by the second virtual application 126. Afterwards, the computing device may render the execution of the translated templates (block 338).

Figure 4:
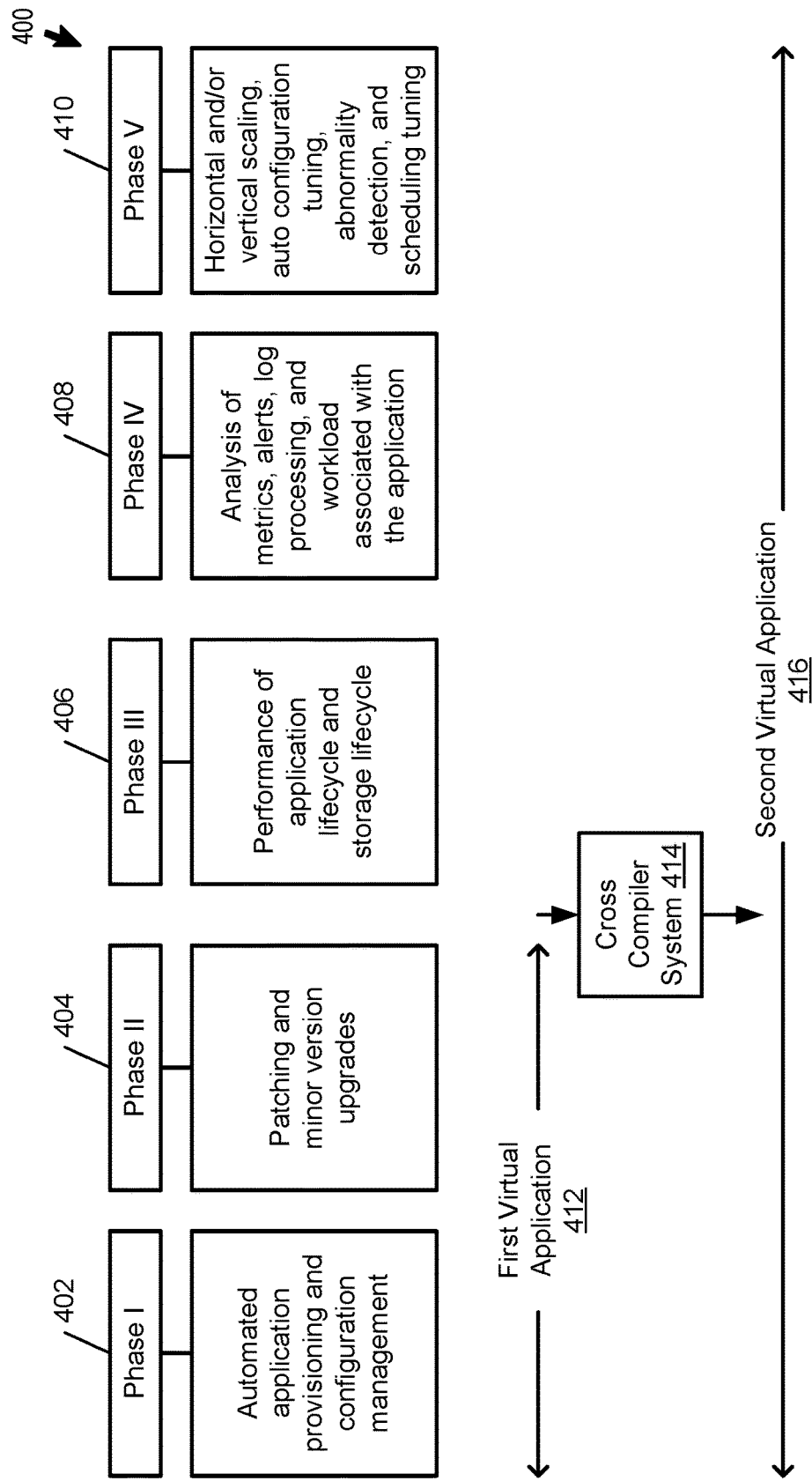
FIG. 4 illustrates a flow diagram showing a system for compiling a specified instruction from a first virtual application to a second virtual application, incorporated in an example software development operation, according to an example embodiment of the present disclosure.

FIG. 4 illustrates a flow diagram showing a method 400 for compiling a specified instruction from a first virtual application to a second virtual application, incorporated in an example software development operation, according to an example embodiment of the present disclosure. Software development operations may typically comprise several phases having several functions and/or sub-operations. The software development operations may be performed and/or facilitated through one or more virtual applications. As shown in FIG. 4, phase I may involve automated application provisioning and configuration management (block 402). Phase II may include performing patching and minor version upgrades to the software being developed (block 404). Phase III may include performance of application lifecycles and storage lifecycles (block 406). Phase IV may involve an analysis of metrics, alerts, log processing, and workload associated with the application (block 408). Phase V may involve horizontal and/or vertical scaling, auto configuration tuning, abnormality detection, and scheduling tuning (block 410).

A user may desire to use one virtual application (e.g., the first virtual application 124) for certain phases of the software development operation but may desire to use another virtual application (e.g., the second virtual application 126) for other phases of the software development. For example, while the first virtual application may be better at basic installation (e.g., automated application provisioning and configuration management) and seamless upgrades (e.g., performing patch and minor version upgrades), the second virtual application may be better at performing full lifecycle analysis (e.g., application lifecycle, storage lifecycle, etc.) providing deep insights about an application (e.g., metrics, alerts, log processing and workload analysis), and performing autopilot functions (e.g., horizontal and/or vertical scaling, auto configuration tuning, abnormal detection, scheduling tuning). Also or alternatively, the second virtual application may support languages or structures that are more conducive to the performance of certain functions of the software development operation. Often, different virtual applications (e.g., HELM, ANSIBLE, etc.), even if they may be supported by the same container-orchestration or software development platform (e.g., KUBERNETES) may not support the same programming languages or support structures. For example, a first virtual application 412, such as HELM, may use a first language (e.g., GOLANG) to perform software development operations in phase I and II, whereas a second virtual application 416, such as ANSIBLE, may use a second language (e.g., JINJA2 and YAML) to conduct various software development operations. A cross compiler system 414 may facilitate the transition of a software being developed (e.g., the specified instruction) from having the first virtual application perform software development operations to having the second virtual application perform and/or continue the next phase of software development operations. The cross compiler system 414 may include subcomponents of, and perform the functions of, cross compiler 104, as previously described.

Figure 5:
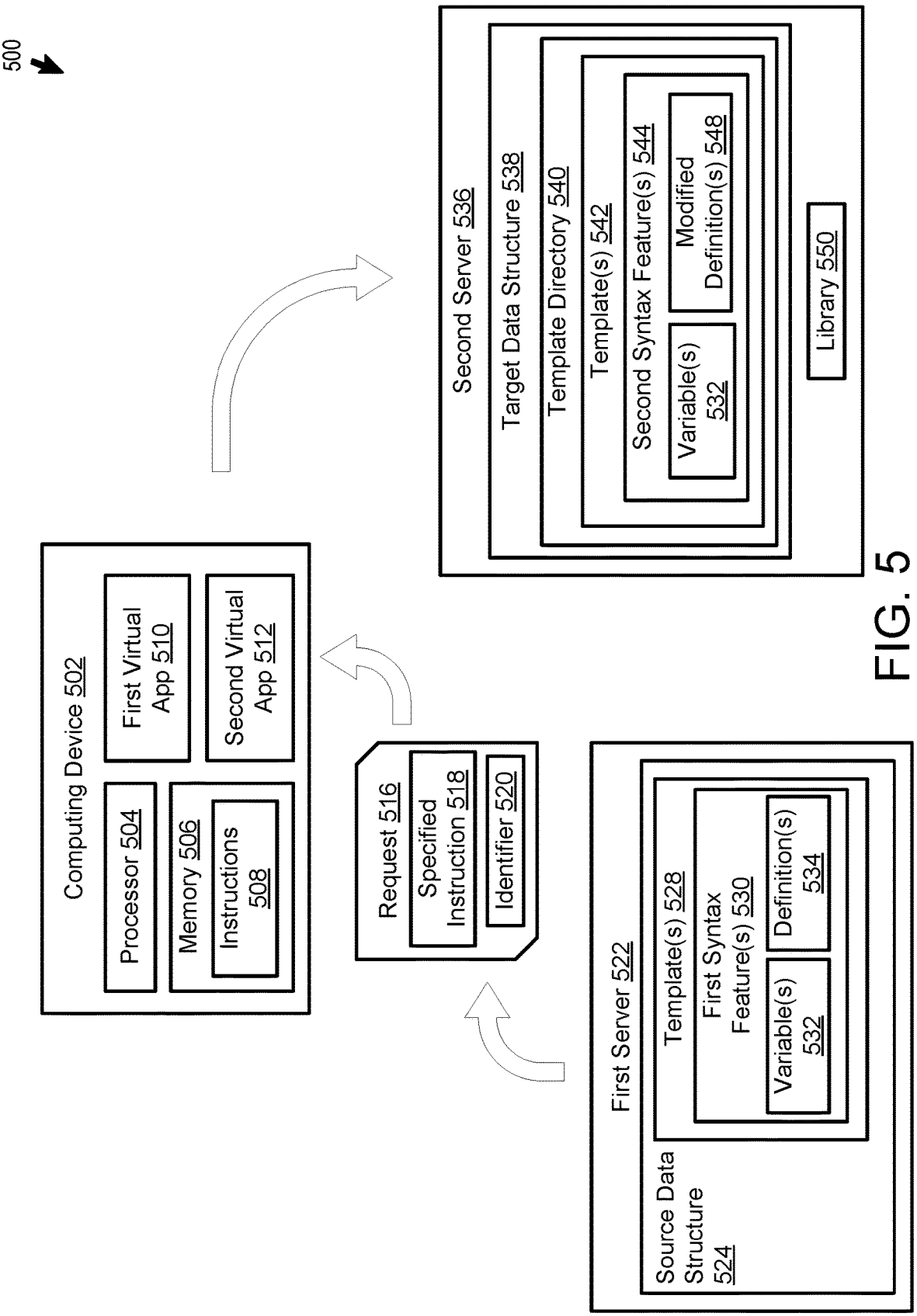
FIG. 5 illustrates a block diagram of an example computer system for compiling a specified instruction from a first virtual application to a second virtual application, according to an example embodiment of the present disclosure.

FIG. 5 illustrates a block diagram of an example computer system 500 for compiling a specified instruction from a first virtual application to a second virtual application, according to an example embodiment of the present disclosure. The example computer system 500 may include a computing device 502; a first server 522 hosting a first virtual application 510 (e.g., which may be running on the computing device 502); and a second server 536 hosting a second virtual application 512 (e.g., which may be running on the computing device 502). The computing device 502 may include memory 506, and a processor 504 in communication with the memory 506. In some aspects, the computing device 502, first server 522, and second server 536 may share similar subcomponents and perform similar functions as computing device 102, first virtual application server 130A, and second virtual application server 130B, respectively.

The memory 506 may store instructions 508 that, when executed by the processor 504, may cause the processor 504 to receive, from the first server 522, a request 516 to compile a specified instruction 518 (e.g., a software, application, or program that may be undergoing one or more application lifecycle operations) for the second virtual application 512. The request 516 may include an identifier 520 of the second server 536. The processor 504 may use the identifier 520 to cause the second server 536 to create a target data structure 538 within the second virtual application 512 (e.g., hosted and/or stored at the second server 536). One or more template(s) 528 identified from the specified instruction 518 may be stored to a template directory 540 in the target data structure 538. Furthermore, the instructions 508, when executed, may cause the processor 504 to identify, from the specified instruction 518, a plurality of first syntax features 530. Each first syntax feature 530 may define a respective variable 532. The instructions 508, when executed, may cause the processor 504 to determine, using the specified instruction 518 and for each first syntax feature 530, a modified definition 548 for the respective variable 532. Based on the modified definitions 548, second syntax features 544 may be generated (e.g., using the library 550 of the second virtual application 512 hosted or managed at the second server 536). The second syntax features 544 may define the respective variables 532 more precisely. The instructions 508, when executed, may cause the processor 504 to render the specified instruction 518 into the one or more templates 542 (e.g., using the second virtual application 512). The specified instruction 518 may thus be expressed via the second syntax features 544 and their respective variables 532. In some aspects, the first virtual application 510 and the second virtual application 512 may be associated with a first programming language and a second programming language, respectively.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   receiving, by a processor and from a first virtual application, a request to execute a specified instruction in a second different virtual application, wherein the first virtual application is associated with a first programming language and a second virtual application is associated with a second different programming language;
   creating, using a library of a second virtual application, a target data structure within the second virtual application;
   storing, to a template directory in the target data structure, one or more templates identified from the specified instruction;
   identifying, from the specified instruction, first syntax features, wherein each first syntax feature defines a respective variable;
   generating, using the specified instruction, an abstract syntax tree to derive, for each first syntax feature, a modified definition for the respective variable;
   generating, based on the modified definitions, and using the library of the second virtual application, second syntax features that define the respective variables more precisely than the first syntax features;
   rendering, using the second virtual application, the specified instruction into the one or more templates, the specified instruction expressed via the second syntax features and their respective variables; and
   executing, by the processor, the specified instruction using the second syntax features, wherein executing the specified instruction using the second syntax features results in less CPU cycles than executing the specified instruction using the first syntax features.

2. The method of claim 1, wherein the generating the second syntax features comprises:
   translating a template function of the first virtual application to a filter replacement.

3. The method of claim 1, wherein the generating the second syntax features results in a smaller allocation of dynamic memory when executing the specified instruction in the second virtual application as compared to executing the specified instruction in the first virtual application.

4. The method of claim 1, further comprising, before the rendering, storing, in the template directory of the target data structure, one or more template properties of the first virtual application.

5. The method of claim 4, further comprising:
   removing, from the template directory, one or more self-references for the one or more template properties that are incompatible in the second virtual application.

6. The method of claim 4, further comprising:
   determining a new template property for a self-reference for the one or more template properties; and
   converting the self-reference to the new template property.

7. The method of claim 1, wherein the first syntax features comprises a first conditional statement, a first branch instruction, and a first function statement for the first virtual application, and wherein the second syntax features comprises a second conditional statement, a second branch instruction, and a second function statement for the second virtual application.

8. The method of claim 7, wherein the generating the second syntax features comprises:
   deriving, after analyzing the specified instruction, a modified definition of an ending of the first branch instruction; and
   generating, based on the modified definition of the ending of the first branch instruction, the second branch instruction, wherein the second branch instruction is more precise than the first branch instruction.

9. The method of claim 1, wherein the generating the second syntax features comprises translating a "range" function to a "for" loop.

10. A system comprising:
    a first server hosting a first virtual application;
    a second server hosting a second different virtual application; and
    a computing device comprising:
      a processor; and
      memory storing instructions that, when executed by the processor, cause the processor to:
        receive, from the first server, a request to compile a specified instruction for the second virtual application, wherein the request includes an identifier of the second server;
        cause, using the identifier, the second server to create a target data structure within the second virtual application;
        store one or more templates identified from the specified instruction to a template directory in the target data structure;
        identify, from the specified instruction, a plurality of first syntax features, each first syntax feature defining a respective variable;
        determine, using the specified instruction and for each first syntax feature, a modified definition for the respective variable;
        generate, based on the modified definitions, and using a library of the second virtual application, second syntax features defining the respective variables more precisely than the first syntax features;
        render, using the second virtual application, the specified instruction into the one or more templates, the specified instruction expressed via the second syntax features and their respective variables; and execute the specified instruction using the second syntax features, wherein executing the specified instruction using the second syntax features results in less CPU cycles than executing the specified instruction using the first syntax features.

11. The system of claim 10, wherein the instructions, when executed, cause the processor to generate the second syntax features by:
   translating a template function of the first virtual application to a filter replacement.

12. The system of claim 10, wherein the system further comprises:
   a library associated with the first virtual application and the second virtual application.

13. The system of claim 10, wherein the first syntax features comprises a first conditional statement, a first branch instruction, and a first function statement for the first virtual application, and wherein the second syntax features comprises a second conditional statement, a second branch instruction, and a second function statement for the second virtual application.

14. The system of claim 13, wherein the instructions, when executed, further cause the processor to generate the second syntax features by:
   determining, based on the first conditional statement defining a variable in the specified instruction, a modified definition of the variable defined by the first conditional statement in the specified instruction; and
   generating, in the target data structure and based on the modified definition of the variable defined by the first conditional statement, a second conditional statement defining the variable more precisely than the first conditional statement.

15. The system of claim 10, wherein the instructions, when executed, further cause the processor to:
   store, in the template directory in the target data structure, one or more template properties of the first virtual application; and
   identify, within the one or more template properties, one or more self-references that are incompatible with the second virtual application.

16. A non-transitory computer readable medium for use on a computer system containing computer-executable programming instructions for cross-compiling a specified instruction between two virtual applications, the instructions comprising:
   receiving, from a first virtual application, a request to compile a source code for the specified instruction for a second different virtual application;
   creating, using a library associated with the second virtual application, a target data structure within the second virtual application;
   storing one or more templates identified from the specified instruction to a template directory in the target data structure;
   identifying, from the source code, a plurality of first syntax features, each first syntax feature defining a respective variable;
   determining, using the specified instruction and for each first syntax feature, a modified definition for the respective variable;
   generating, based on the modified definitions, and using the library of the second virtual application, second syntax features defining the respective variables more precisely than the first syntax features;
   rendering, using the second virtual application, the specified instruction into the one or more templates, the specified instruction comprising the second syntax features and their respective variables; and
   executing the specified instruction using the second syntax features, wherein executing the specified instruction using the second syntax features results in less CPU cycles than executing the specified instruction using the first syntax features.

17. The non-transitory computer readable medium of claim 16, wherein the first syntax features comprises a first conditional statement, a first branch instruction, and a first function statement for the first virtual application, and wherein the second syntax features comprises a second conditional statement, a second branch instruction, and a second function statement for the second virtual application.

18. The non-transitory computer readable medium of claim 17, wherein the generating the second syntax features comprises:
   determining, based on the first conditional statement defining a variable in the specified instruction, a modified definition of the variable defined by the first conditional statement in the specified instruction; and
   generating, in the target data structure and based on the modified definition of the variable defined by the first conditional statement, a second conditional statement defining the variable more precisely than the first conditional statement.

19. The non-transitory computer readable medium of claim 16, wherein the determining the modified definition, for each variable, further comprises:
   generating an Abstract Syntax Tree (AST) to derive the modified definitions for the respective variables defined by the first syntax features.

* * * * *